Figure 5:
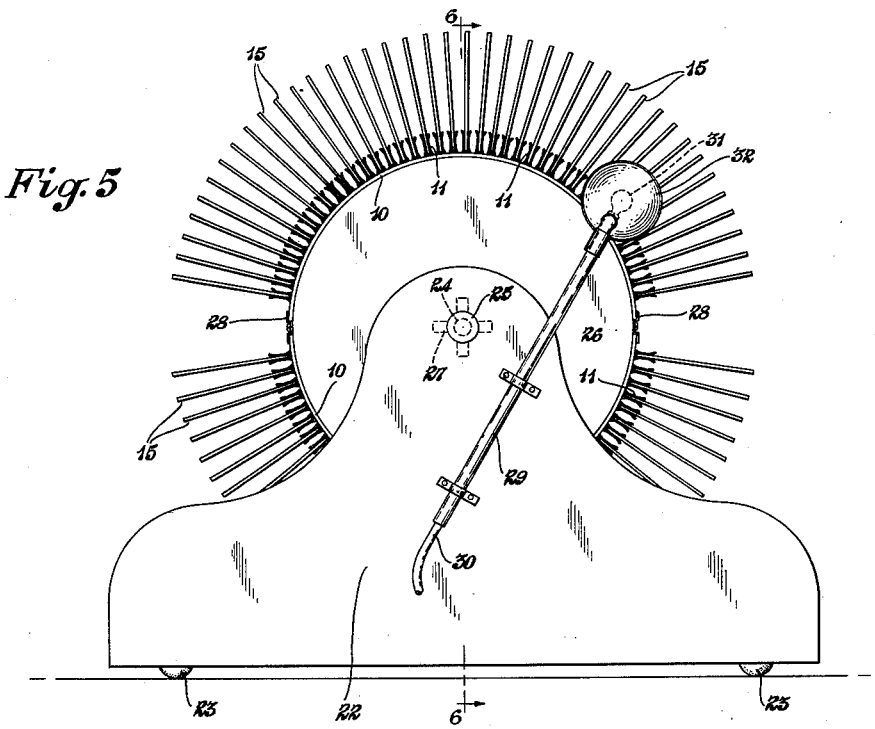

June 13, 1950 — H. A. McCLAIN — 2,511,730
HOLDER AND FILE FOR PHOTOGRAPHIC SLIDES
Filed April 9, 1948 — 2 Sheets-Sheet 1
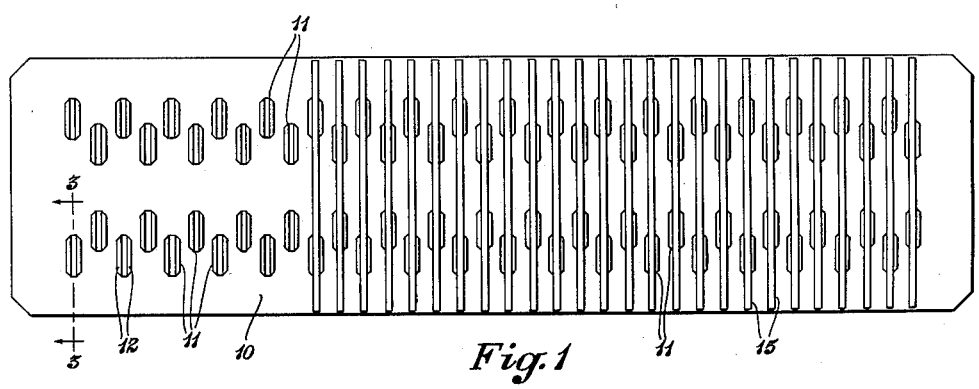
Fig. 1
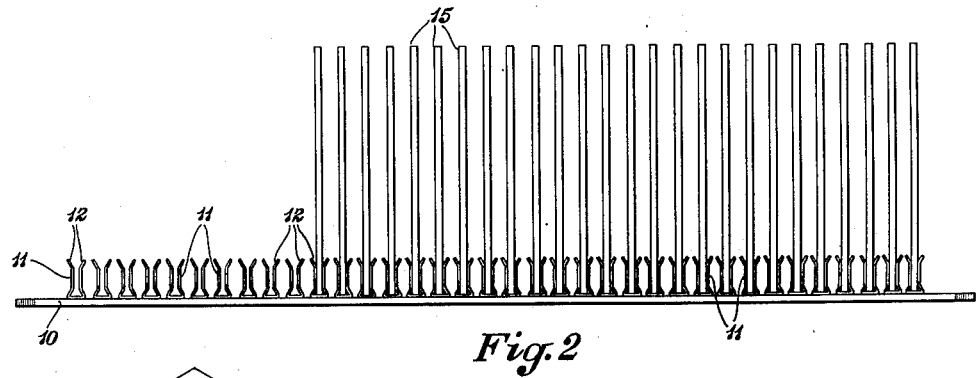
Fig. 2
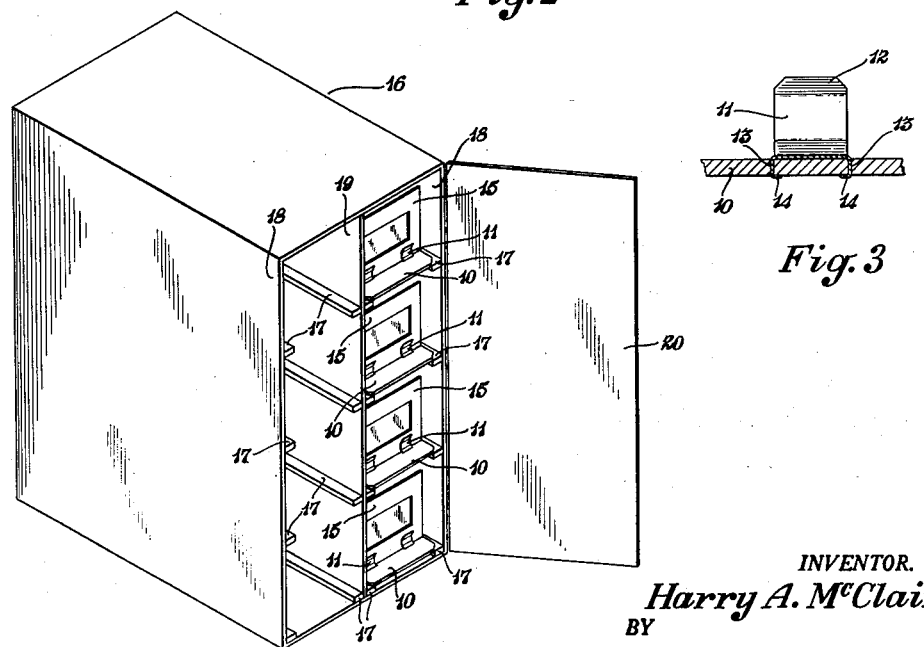
Fig. 3
Fig. 4
INVENTOR.
Harry A. McClain
BY
ATTORNEYS June 13, 1950 H. A. McCLAIN 2,511,730
HOLDER AND FILE FOR PHOTOGRAPHIC SLIDES
Filed April 9, 1948 2 Sheets-Sheet 2

INVENTOR.
Harry A. McClain
BY
ATTORNEYS

Patented June 13, 1950

2,511,730

UNITED STATES PATENT OFFICE 2,511,730

HOLDER AND FILE FOR PHOTOGRAPHIC SLIDES

Harry A. McClain, Canton, Ohio

Application April 9, 1948, Serial No. 19,987

5 Claims. (Cl. 45—3)

The invention relates to means for holding photographic slides in such condition that they will be easily accessible for exhibiting in a projector, and may be filed and stored in an orderly fashion when not in use.

Photographic slides and the like, which are mounted for exhibition in a projector, are ordinarily stored in metal, wood or cardboard boxes, in which the slides are placed side by side, in upright position or horizontally in piles. It is difficult to remove the slides, one at a time from the box when it is desired to exhibit them, and usually the slides become badly disarranged with each exhibition thereof, requiring that they be sorted and rearranged.

It is therefore an object of the present invention to provide apparatus for holding such slides in any desired arrangement, in a compact manner for filing and storing them when not in use, and for rendering them easily accessible for removal one at a time for exhibiting in a projector.

Another object is to provide a holder in the form of a normally flat strip of flexible material, having a plurality of spaced, transverse channels, grooves or clips for detachably receiving the lower edges of the slides.

A further object is to provide means for flexing such a strip in arcuate shape whereby the slides will assume radial positions, their upper, or outer, free edges being separated sufficiently to permit quick and easy removal and replacement of each slide.

Another object is to provide such an apparatus including a rotatable drum upon which the strip carrying the slides may be detachably mounted, whereby each slide may be easily brought into position where it may be readily accessible for removal.

Still another object of the invention is to provide a light in connection with such a device, which will adequately illuminate the channels, grooves or clips from which the slide may be removed and replaced while not interfering with the exhibition of the slides in the projector.

A further object is to provide a device of the character referred to in which the slides or the like may be easily and readily removed for exhibition in a projector, and replaced so that the slides may be kept in proper arrangement at all times.

A still further object is the provision of apparatus of this character including means for holding the flexible strips, carrying the slides, flexed in arcuate position for use, and in flat condition for filing and storage when not in use.

Figure 6:
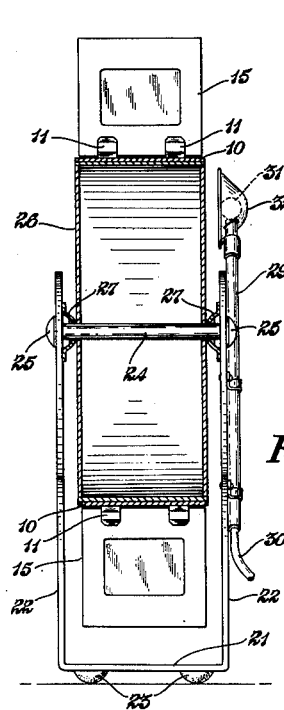

The above objects together with others which will be apparent from the drawings and following description, or which may be later referred to, may be attained by constructing the improved apparatus in the manner hereinafter described in detail and illustrated in the accompanying drawings, in which:

Figure 1 is a plan view of a flexible strip for carrying a plurality of photographic slides or the like, showing the same in flat condition;

Fig. 2 a side elevation of the device shown in Fig. 1;

Fig. 3 an enlarged, fragmentary, sectional view, showing one of the channel or clip members for detachably holding the slides upon the flexible strips;

Fig. 4 a perspective view of a cabinet for filing and storing the strips containing slides when not in use, showing the manner in which the strips may be housed therein;

Fig. 5 a side elevation of an apparatus comprising a rotatable drum, upon which the flexible strips may be flexed and held in arcuate condition for easy access to the slides in order to exhibit them in a projector or the like and easy removal and replacement of the slides;

Fig. 6 a sectional view taken on the line 6—6, Fig. 5; and

Figure 7:
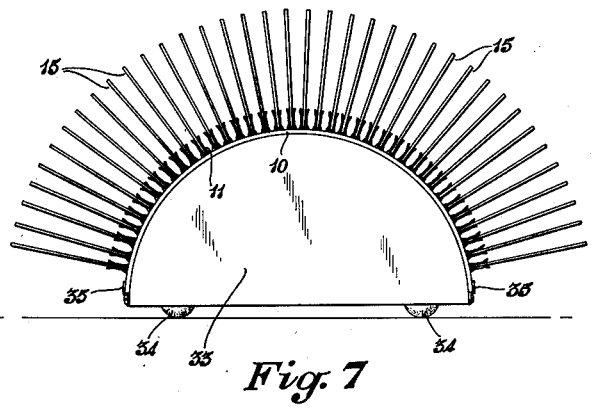

Fig. 7 a side elevation of a modified form of apparatus for holding the flexible strips, carrying the slides, in arcuate condition.

Referring now more particularly to the form of the invention illustrated in the drawings, in which similar numerals refer to similar parts throughout, a flexible strip is shown at 10, which may be formed of sheet metal, plastic, fibreboard, or other flexible material, having a plurality of spaced, transverse grooves, channels or clips thereon for detachably receiving the lower edges of slides of the like.

These grooves, channels or clips may be of the construction best shown in Figs. 1, 2 and 3, comprising spaced pairs of channel members 11, which may be formed of sheet metal, plastic or other suitable resilient, or flexible, material, the upper, open edges of which are preferably flared outwardly as indicated at 12, so as to permit the slides to be easily inserted therein.

The channel members 11 may be molded or attached to the flexible sheet 10 by means of integral tangs 13, formed upon the opposite ends of the channel members and located through the strip 10 and clinched over upon the under side thereof as at 14.

These channel members are located in spaced pairs upon the strip so that the lower edge portion of each color slide, indicated generally at 15, may be engaged near opposite ends in the channel members 11 of each spaced pair. Preferably, alternate pairs of these channel members may be staggered upon the flexible strip 10, as shown in Fig. 1, when they are attached in the manner shown in Fig. 3, in order to prevent excessive weakening of the flexible strip.

Ordinarily about eighteen to twenty color slides may be made from each roll of film, and it is preferable that each of the flexible strips 10 be of such length, and provided with the proper number of channel members, or grooves, to hold two rolls of films of slides, whereby related slides may be mounted in any desired arrangement.

When not in use the flexible strips 10, carrying the slides, may be housed in flat condition, in a cabinet or box, such as indicated generally at 16 in Fig. 5, into which the individual strips 10 may be slidably received upon guide members 17 mounted upon the side and partition walls 18 and 19 of the cabinet. The individual strips of slides may be indexed and housed in any desired arrangement within this cabinet, and may be normally enclosed therein as by the hinged door 20.

For the purpose of mounting the slides so that they are easily accessible for removal from and replacement upon the flexible strip, when it is desired to exhibit the films in a projector or the like, an apparatus such as shown in Figs. 5 and 6, may be provided.

For this purpose a standard may be formed from sheet metal, or other suitable material, comprising the flat base 21 and spaced upright side members 22, preferably shaped as best shown in Fig. 5. Feet or buttons 23, formed of rubber or similar material, may be provided upon the under side of the base 21 so as not to mar a table top or other surface upon which the apparatus may be placed for use.

A shaft 24 is located through the side members 22 and provided with a head 25 or the like at each end to retain the shaft in place. A cylindrical drum 26, which may be formed of any suitable material, and may be either hollow or solid, is mounted upon the shaft 24 for rotation relative to the standard.

In order to provide a drag, or brake, to prevent the drum from rotating too freely upon the shaft, and to hold it in any position to which it may be rotated, spring washers, or the like, as indicated at 27, may be located between each side of the drum and the adjacent side member 22 to frictionally engage the sides of the drum as best shown in Fig. 6.

Any suitable device for detachably engaging the ends of the strips 10, such as the keepers shown at 28, may be mounted upon the periphery of the drum. When opposite ends of a strip 10 are engaged in the keepers 28, the strip is flexed around the periphery of the drum, in arcuate condition, holding all of the slides thereon in radial position, with the outer edges thereof sufficiently spaced apart to permit the slides to be easily removed and replaced individually by the thumb and forefinger. The drum 26 is preferably of such proportions that two of the strips 10 may be mounted thereon at one time, as best shown in Fig. 5.

In order to provide sufficient illumination at the point where the slides are removed from the drum and replaced thereon, and at the same time so as not to cause interference with the exhibiting of the slides in a projector, a small light may be provided comprising a tubular post 29, attached to one of the side members 22 of the standard, an electric cord 30 being located therethrough and connected to a small light bulb 31 at the upper end of the post, a shade 32 being provided for the bulb so as to direct the light therefrom upon the point where the slides are removed from and replaced upon the drum.

In the operation of the apparatus, when it is desired to exhibit the slides, the apparatus shown in Figs. 5 and 6 is placed in a convenient position adjacent to the projector and the drum is rotated to position locating one endmost slide on one strip adjacent to the light, in position where it may be easily accessible for removal from the strip and the replacement thereto.

This endmost slide is removed from the strip and placed in the projector, and after it has been exhibited the next adjacent slide may be easily removed for exhibition in the projector while the slide which has just been exhibited is returned to its original position upon the strip.

As the slides are thus removed from the drum for exhibition the drum may be slowly rotated from time to time, so as to bring the several slides on each strip into position where they are easily accessible for removal and replacement.

After the slides on each strip have been thus exhibited in the projector, the strips may be easily detached from the drum and permitted to assume a flat condition, as shown in Figs. 1 and 2, and may be returned to the proper places within the cabinet 16, where the strips, with slides carried thereon, may be indexed and filed in any desired arrangement, and other strips carrying slides may be removed from the cabinet and detachably mounted upon the drum to be exhibited in the manner above described.

In Fig. 7 is shown a modification of the apparatus for holding the strips flexed in arcuate condition so that the slides thereon are radially disposed and easily accessible for removal from the strip. In this device the semi-cylindrical block 33 is substituted for the drum shown in Figs. 5 and 6.

Rubber buttons, or feet 34, may be provided upon the flat under side of the block 33 for contact with the table top or other surface upon which the device may be placed for use. Means for detachably connecting a strip 10 to the block, so as to flex the strip in arcuate condition around the curved surface of the block, may be located at opposite ends of the block, such as the keepers 35, similar to those shown and described in Figs. 5 and 6, and adapted to engage opposite ends of the strip 10, which is thus flexed around the half cylindrical upper surface of the block in the manner shown in Fig. 7, holding the slides 15 in arcuate position so that their outer, or free, edges are sufficiently spaced apart to permit them to be easily and readily removed and replaced individually.

From the above it will be obvious that a simple, efficient and easily operated apparatus is provided for holding the slides in any desired arrangement for compactly filing and storing them when not in use and for easily and readily removing individual slides for exhibition purposes and replacing them in proper order.

I claim:

1. A holder for photographic slides comprising a normally flat, flexible strip, means upon the strip for detachably mounting a plurality of slides transversely thereon in upright, parallel relation, a member having an arcuate surface, and means thereon for detachably mounting said strip, flexed in arcuate condition, upon said arcuate surface, so that the slides thereon will be radially disposed with their outer edges separated sufficiently to permit their being easily removed individually from the strip and replaced thereon.

2. A holder for photographic slides comprising a normally flat, flexible strip, means upon the strip for detachably mounting a plurality of slides transversely thereon in upright, parallel relation, a rotatable drum, and means for detachably mounting said strip, flexed in arcuate condition, around the periphery of the drum, so that the slides thereon will be radially disposed with their outer edges separated sufficiently to permit their being easily removed individually from the strip and replaced thereon.

3. A holder for photographic slides comprising a normally flat, flexible strip, means upon the strip for detachably mounting a plurality of slides transversely thereon in upright, parallel relation, a rotatable drum, means for holding the drum in adjusted position, and means for detachably mounting said strip, flexed in arcuate condition, around the periphery of the drum, so that the slides thereon will be radially disposed with their outer edges separated sufficiently to permit their being easily removed individually from the strip and replaced thereon.

4. A holder for photographic slides comprising a normally flat, flexible strip, means upon the strip for detachably mounting a plurality of slides transversely thereon in upright, parallel relation, a member for receiving said strip, and means upon said member for detachably mounting said strip flexed in arcuate condition thereon, so that the slides upon the strip will be radially disposed with their outer edges separated sufficiently to permit their being easily removed individually from the strip and replaced thereon.

5. A holder for photographic slides comprising a normally flat, flexible strip, means upon the strip for detachably mounting a plurality of slides transversely thereon in upright, parallel relation, a block for receiving said strip, and spaced means upon said block for engaging opposite ends of the strip for detachably mounting said strip flexed in arcuate condition thereon, so that the slides upon the strip will be radially disposed with their outer edges separated sufficiently to permit their being easily removed individually from the strip and replaced thereon.

HARRY A. McCLAIN.

REFERENCES CITED

The following references are of record in the file of this patent:

UNITED STATES PATENTS

| Number | Name | Date |
|---|---|---|
| 360,272 | Blish | Mar. 29, 1887 |
| 2,080,805 | Brey | May 18, 1937 |
| 2,279,643 | Silver | Apr. 14, 1942 |
| 2,389,923 | Miller | Nov. 27, 1945 |

FOREIGN PATENTS

| Number | Country | Date |
|---|---|---|
| 175,544 | Great Britain | Feb. 23, 1922 |